United States Patent
Tachtler et al.

(10) Patent No.: US 7,226,682 B2
(45) Date of Patent: Jun. 5, 2007

(54) FUEL CELL WITH INTEGRATED HEAT EXCHANGER

(75) Inventors: Joachim Tachtler, Ismaning (DE); Franz-Josef Wetzel, Gernlinden (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 67 days.

(21) Appl. No.: 10/645,520

(22) Filed: Aug. 22, 2003

(65) Prior Publication Data

US 2005/0014046 A1    Jan. 20, 2005

Related U.S. Application Data

(63) Continuation of application No. PCT/EP02/02276, filed on Mar. 2, 2002.

(30) Foreign Application Priority Data

Mar. 17, 2001   (DE) ............................... 101 13 002

(51) Int. Cl.
*H01M 8/04*      (2006.01)
*H01M 8/02*      (2006.01)
(52) U.S. Cl. .............................. 429/26; 429/38; 429/39
(58) Field of Classification Search .................. 429/13, 429/26, 34, 38, 39
See application file for complete search history.

(56) References Cited

U.S. PATENT DOCUMENTS 5,212,023 A  *  5/1993  Diethelm ..................... 429/26

| | | | |
|---|---|---|---|
| 5,919,584 A | 7/1999 | Akagi | |
| 6,569,554 B1 | 5/2003 | Doggwiler et al. | |

FOREIGN PATENT DOCUMENTS

| | | |
|---|---|---|
| DE | 19945715 A1 | 4/2001 |
| EP | 0399077 A1 | 11/1990 |
| EP | 0437175 A1 | 7/1991 |
| EP | 0749171 A1 | 12/1996 |
| EP | 1075033 A1 | 2/2001 |
| EP | 1098381 A1 | 5/2001 |
| JP | 60-68562 | 4/1985 |
| JP | 61-148768 | 7/1986 |
| JP | 61-193370 | 8/1986 |
| JP | 61-233978 | 10/1986 |
| JP | 63-86270 | 4/1988 |
| JP | 63-285873 | 11/1988 |

OTHER PUBLICATIONS

International Search Report, PCT International Application PCT/EP02/02276, published with WO 02/075833 A3, Sep. 26, 2002.

* cited by examiner

*Primary Examiner*—Jonathan Crepeau
(74) *Attorney, Agent, or Firm*—Crowell & Moring LLP

(57) ABSTRACT

A fuel cell includes at least one individual cell with an electrolyte/electrode unit, as well as at least one conducting end or intermediate plate, via which a gaseous reactant can be supplied to an electrode at least in one inlet region. In order to lower power losses, as well as the need for gas circulation, the end or intermediate plate is designed so that in terms of flow, a heat exchange region is incorporated before an inlet region, and heat is removed from an anode side of the individual cell in the heat exchanger.

5 Claims, 1 Drawing Sheet

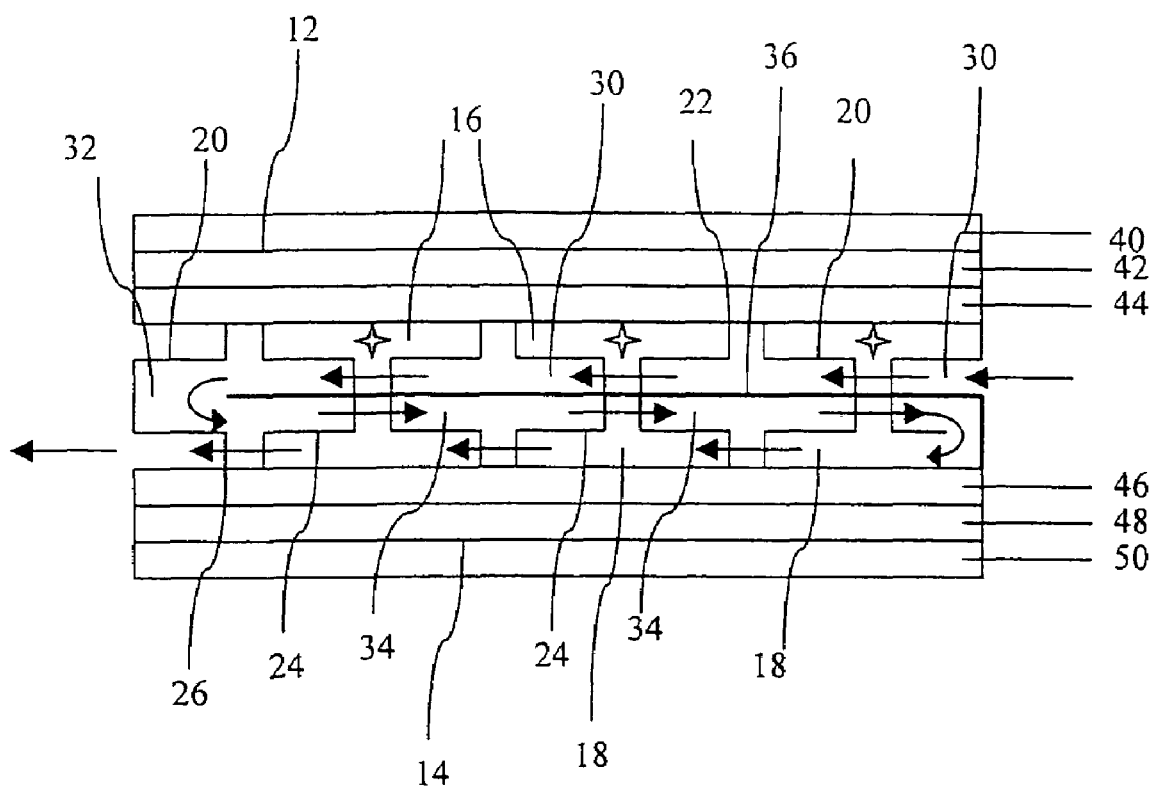

FUEL CELL WITH INTEGRATED HEAT EXCHANGER

This is a continuation of international application PCT/EP02/02276, with an international filing date of Mar. 2, 2002, the entire disclosure of which is incorporated herein by reference.

This application also claims the priority of prior German application 101 13 002.3, filed Mar. 17, 2001.

BACKGROUND AND SUMMARY OF THE INVENTION

It is a known fact for fuel cells, especially high temperature fuel cells (such as SOFC fuel cells), that the cathode-side gaseous reactant (e.g., the reaction air) should be pre-warmed to bring it to the required reaction temperature. This is conventionally performed in a separate high temperature heat exchanger. Such a heat exchanger, however, is bulky, heavy and expensive. Moreover, such a heat exchanger necessitates complex tubing as well as a cost-intensive regulating and control system.

It is an object of the present invention to provide a fuel cell which effects the necessary warming of the cathode-side gaseous reactant without the aforementioned disadvantages.

Accordingly, an end or intermediate plate, which is arranged on or between the various electrolyte/electrode units (individual cell), is designed so that, in terms of flow before an inlet region, particularly a cathode-side inlet region, a heat exchange region is incorporated, in which heat is removed from an anode side and thus the gaseous reactant (e.g., air) is heated to the required reaction temperature.

A core idea of the present invention thus is to integrate a heat exchanger, for example, in a bipolar plate, and to conduct the gaseous reactant that must be heated (e.g., the air) along the hot anode side. The gaseous reactant is not supplied to the appropriate electrode (e.g., cathode) for generating power until it has flowed through this area acting as a heat exchanger.

The end or intermediate plate can be designed so that, for example, a reversal of the flow direction of the gaseous reactant is accomplished. In this way, the gaseous reactant can be conducted through the heat exchanger in a serpentine fashion in order to enable even better heat transfer in the heat exchanger.

The end or intermediate plate (e.g., bipolar plate) preferably contains three flow regions, specifically an anode flow section between the end or intermediate plate and an adjacent anode of an individual cell, a return current heat exchange section adjacent to the anode flow section, and a cathode flow section between the end or intermediate plate and a cathode of another individual cell.

Pursuant to a particularly preferred design, the end or intermediate plate is composed of at least two separate partial elements that can be joined together. At least part of the heat exchange section is included between the two partial elements, and the heat exchange section is connected in terms of flow with the region that later forms the cathode section. If a baffle is arranged between the two partial elements, a serpentine-conducted flow is easy to produce, so that the direction of flow of the gaseous reactants in both partial sections is in the opposite direction.

For a design of the individual flow regions, spacer elements, e.g., in the shape of nubs, can be provided on the individual sides of the end or intermediate plates, as well as between the partial elements, so that the spacer elements rest either against each other or against the individual cells. The nubs can be produced through an embossing or deposition method and shaped as required.

A simple design of the present invention is described in the following in more detail while referencing the attached FIGURE.

BRIEF DESCRIPTION OF THE DRAWING

The attached drawing FIGURE is a rough sketch providing a partial sectional view of a fuel cell according to the invention.

DETAILED DESCRIPTION OF THE INVENTION

As shown in the drawing FIGURE, a fuel cell according to the invention has a first individual cell 12, comprising a cathode 40, electrolyte 42 and anode 44, and a second individual cell 14, comprising a cathode 46, electrolyte 48 and anode 50. Both individual cells represent a ceramic electrolyte/electrode unit, which is not explained in detail and between which an intermediate plate, in this case a bipolar plate, is arranged. The bipolar plate serves to introduce the various gaseous reactants in the respective electrode sides (anode 44, cathode 46) of the individual cells 12, 14 as well as to produce electric conductivity.

The bipolar plate in the present case is designed as a two-piece unit, including a first nub plate 20 and a second nub plate 24, which is designed substantially laterally reversed in relation to the bisecting line of the drawing.

Each nub plate 20 and 24 comprises a plate, on the bottom and top surfaces of which a plurality of nubs (reference numbers 22 and 26) are arranged, respectively. These nubs 22, 26 create both a space to the electrodes (anode, cathode) of the various individual cells 12 and 14 and a space between the two nub plates 20 and 24 as such.

The design of the nubs, which in the present case were produced by an embossing method in the plates, creates various flow regions in the developing clearance spaces, for one on the anode side a first flow region 16 between the nub plate 22 and the anode of the individual cell 12, in which a gaseous reactant, for example $H_2$, natural gas or gas/diesel reformate, can be introduced. In the present case, this is indicated in the sketch by the four-point stars in the anode flow region 16. The flow of the gaseous reactant here occurs into the focal plane, i.e., vertical to the image.

A baffle 36 is arranged between the two nub plates 20 and 24 of the bipolar plate. The baffle both separates the flow regions developing between the two nub plates 20 and 24 from each other and creates a deflection region 32, in which the direction of flow of the second gaseous reactant—here air—is reversed. The air is conducted in the direction of the arrow into the bipolar plate and initially moves in the flow region 30 created by the nubs along the anode or past the anode-side flow region 16. This creates a heat transfer from the hot anode side to the air that is initially still at room temperature or that has been pre-warmed in a simple configuration. The air thus warms up. After the air current has flowed almost completely across the length of the individual cell, it is reversed at the end of the baffle 36, wherein the air flow then—also in the direction of the arrow—crosses the bipolar plate again essentially across its width beneath the baffle 36 in the opposite direction to the upper flow direction. This also heats the air. On the second flow region 34 on the right end of the figure, the direction of flow is reversed again, caused by an area of the baffle 36 that is bent at a 90° angle, so that that the air is guided into the cathode flow region 18. The air, which has meanwhile been brought to reaction temperature, is then supplied to the cathode of the individual cell 14 and used to generate power.

The present invention thus incorporates the bipolar plate into a heat exchanger, comprising the heat exchanger chambers 30 and 34. The air flows through these chambers before the reactant reaches the cathode flow region. The fuel cell, which is operated at a high temperature, heats the air sufficiently to the reaction temperature so that a separate complex heat exchanger arranged upstream is not required. In this way, air flow can be reduced compared to existing configurations. Beyond that, the gravimetric and volumetric power density levels can be increased while simultaneously lowering manufacturing costs. Moreover it is possible to avoid ceramic-incompatible thermal stress. And finally the efficiency of such a fuel cell can be lowered by reducing the parasitic power requirements of the reaction air blower by having the possibility of drastically reducing the need for air circulation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A fuel cell comprising:
   at least two individual cells with an electrolyte/electrode unit, said cells each having a cell face opposing an adjacent cell face of another of the at least two individual cells, said opposing faces disposed parallel to one another, wherein one of said opposing faces is an anode of one of the cells and the adjacent opposing face is a cathode of the opposing cell, and
   at least one conducting end or intermediate plate extending substantially perpendicularly between said parallel opposing cell faces, each plate including:
   at least two substantially identical or mirror-image partial elements paired together to form each plate,
   air conducting channels or guiding areas arranged to direct a gaseous reactant directly along an anode side of the at least one conducting end or intermediate plate and subsequently along the cathode,
   at least one section of a heat exchanger incorporated between the at least two partial elements and arranged to transfer heat from the gaseous medium on an anode side of the heat exchanger to the gaseous medium on a cathode side of the heat exchanger, and
   a baffle between the at least two partial elements, said baffle arranged to create two partial flow regions through which the gaseous medium flows successively and in opposite directions about the heat exchanger.

2. The fuel cell according to claim 1, wherein individual partial elements of the at least one end or intermediate plate comprise spacer elements so that the individual partial elements are arranged at a distance from an anode and a cathode of individual cells while forming flow regions.

3. The fuel cell according to claim 2, wherein the spacer elements are nubs.

4. The fuel cell according to claim 3, wherein the nubs are produced through an embossing or deposition method.

5. The fuel cell according to claim 4, wherein surfaces of the nubs come into contact with the baffle and have good electric interconnection with the baffle.

\* \* \* \* \*